United States Patent

[11] 3,627,983

[72] Inventor Lenox K. Pickering
    Morristown, N.J.
[21] Appl. No. 856,418
[22] Filed Sept. 9, 1969
[45] Patented Dec. 14, 1971
[73] Assignee Charles Beseler Company
    East Orange, N.J.

[54] SELF-CLEANING HEATING ELEMENT FOR HEAT-SEALING APPARATUS
    8 Claims, 4 Drawing Figs.
[52] U.S. Cl........................................... 219/243,
    83/168
[51] Int. Cl........................................... H05b 1/00
[50] Field of Search.................................... 219/243,
    248, 250, 251, 252, 256, 255, 257; 53/39, 279,
    DIG. 3; 83/16, 168, 171; 156/251, 512, 583

[56] References Cited
UNITED STATES PATENTS
1,810,987  6/1931  Schmitt........................ 83/171
2,796,913  6/1957  Fener et al.................... 156/251
3,245,294  4/1966  Butter et al................... 83/168 X Primary Examiner—J. V. Truhe
Assistant Examiner—C. L. Albritton
Attorney—Darby and Darby ABSTRACT: Heat-sealing apparatus in which the sealing action is initiated by contact of the heating element with the article to be sealed and terminated by a temperature-sensitive switch which causes the heating element to be removed from the article to be sealed. Further heat is applied to the heating element after it is removed from the article to be sealed in order to "burn-off" any residue. This self-cleaning action is terminated by a second temperature-sensitive switch.

INVENTOR
LENOX K. PICKERING

BY Darby + Darby

ATTORNEYS

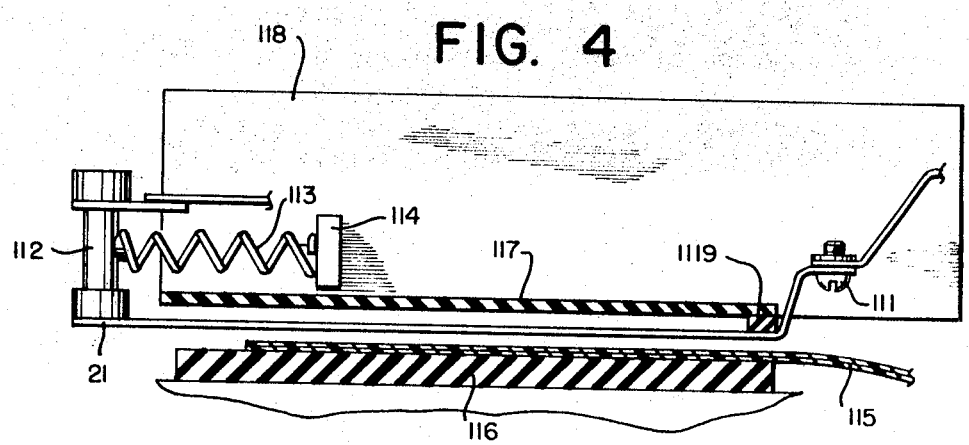

SELF-CLEANING HEATING ELEMENT FOR HEAT-SEALING APPARATUS

This invention relates to a self-cleaning heating element for applying a controlled amount of heat to an article. More particularly, this invention relates to a temperature controlled self-cleaning heating element for use in heat-sealing apparatus or the like.

One application of heat-sealing apparatus of the type with which the present invention is concerned is in the field of shrink film packaging. In shrink film packaging, heat-sealing apparatus is used to seal an envelope of thin transparent heat-shrinkable plastic film around an article. The envelope and article are then heated to cause the envelope to shrink and conform to the contours of the article to be packaged.

One difficulty of conventional heat-sealing apparatus is that deposits of plasticizer and carbon from the plastic film tend to adhere to the heating element. If these deposits are allowed to build up, they interfere with the uniform transfer to heat from the heating element to the plastic film thus preventing the formation of strong consistent seals. Hence, it is necessary for proper operation of the heat-sealing apparatus that the deposits be removed or prevented from building up on the heat element.

One technique which has been employed in order to remove deposits is the simple mechanical scraping of the heating element from time to time. The disadvantage of this technique is that it interrupts production. Another technique for preventing the buildup of deposits involves the interposing of a suitably coated glass cloth between the heating element and the plastic film. However, the glass cloth must be shifted frequently to prevent the heating element from burning through. This also tends to reduce production rates.

It is, therefore, an object of this invention to provide an improved self-cleaning heating element.

More particularly, it is an object of this invention to provide a heating element for use in heat-sealing apparatus including a simple self-cleaning mechanism which does not interfere with the production process.

According to the above and other objects, the present invention provides apparatus in which a controlled pulse of heat is applied to the heating element while it is in contact with the article to be heated and a second controlled pulse of heat is applied to the heating element after it has been removed from the article to be heated in order to burn off any deposits of plasticizer or carbon which may have adhered to the heating element. The apparatus includes an electrical resistance heating element, a switch for applying electrical power to the heating element upon contact of the heating element with the article to be heated, a first temperature-sensitive switch for signalling when the heating element reaches a first predetermined temperature whereupon it may be removed from the article to be heated for self-cleaning, and a second temperature-sensitive switch for cutting off the electric power to the heating element when the heating element reaches a second predetermined temperature.

Other objects and advantages of the present invention will be apparent from the following detailed description and accompanying drawings which set forth the principles of the invention, and by way of example, the best mode contemplated for applying those principles.

In the drawings:

FIG. 4 is a side elevational view of the heating element according to the present invention.

Figure 1:
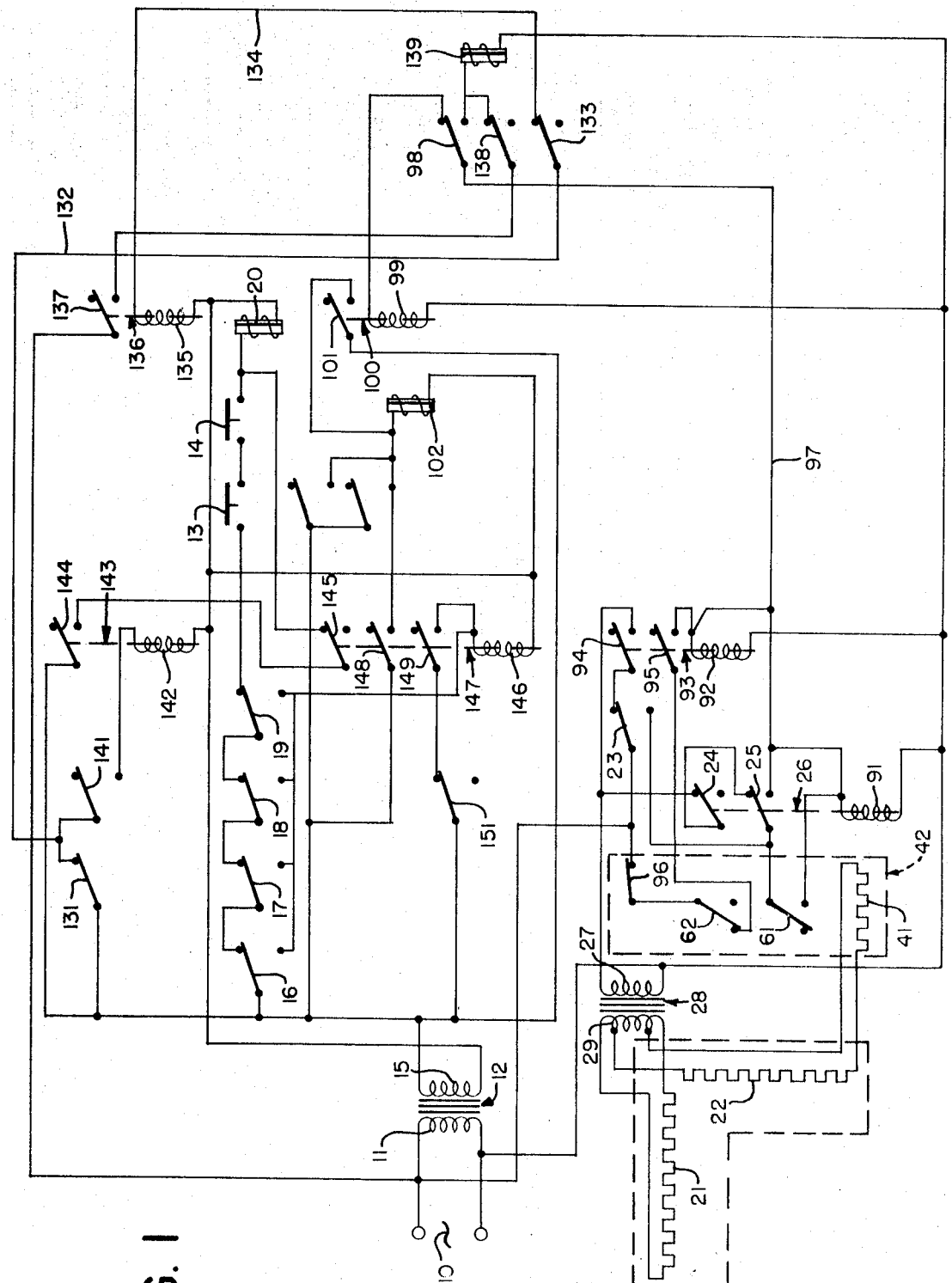
FIG. 1 is a schematic diagram of the electrical circuits for controlling a heating element according to the present invention.

Referring in detail to FIG. 1 of the drawings, there is shown a schematic diagram of the electrical circuits for controlling the heating element in the preferred form of heat-sealing apparatus according to the present invention. Electrical power is provided by a source of alternating current 10 which is connected to the terminals of primary winding 11 of stepdown transformer 12. The cycle of operation is initiated by the operator who presses down buttons 13 and 14, thus establishing a circuit from the secondary winding 15 of stepdown transformer 12 through safety switches 16, 17, 18 and 19 and solenoid 20. In the preferred form of the present invention, solenoid 20 actuates an air valve which, in turn, operates a mechanism (not shown) to bring the heating elements 21 and 22 into contact with the article to be sealed. A contact switch 23 is mechanically actuated by the contact of heating elements 21 and 22 with the article to be sealed to establish a circuit from the power source 10 through the normally closed contacts 24 and 25 of relay 26 to the primary winding 27 of transformer 28. The secondary winding 29 of transformer 28 is appropriately connected to the heating elements 21 and 22. The number of turns of secondary winding 29 applied to each of the two heating elements 21 and 22 is determined by the length of the heating elements so that the same number of volts/inch are applied to each heating element thereby providing substantially identical heating characteristics.

The two heating elements 21 and 22 are preferably arranged in the conventional L-shaped configuration which is used, for example, in the heat sealing machines manufactured by the Charles Beseler Company of East Orange, N.J.

According to the present invention, an auxiliary heating element 41 is connected in series with one of the two operative heating elements such as, for example, heating element 22. This auxiliary heating element 41, sometimes called the "monitor wire", forms a part of the control mechanism 42 which is shown in greater detail in FIGS. 2 and 3. It will be appreciated that the monitor wire 41 has the same heating characteristics as the heating element 22 to which i is attached.

Figure 2:
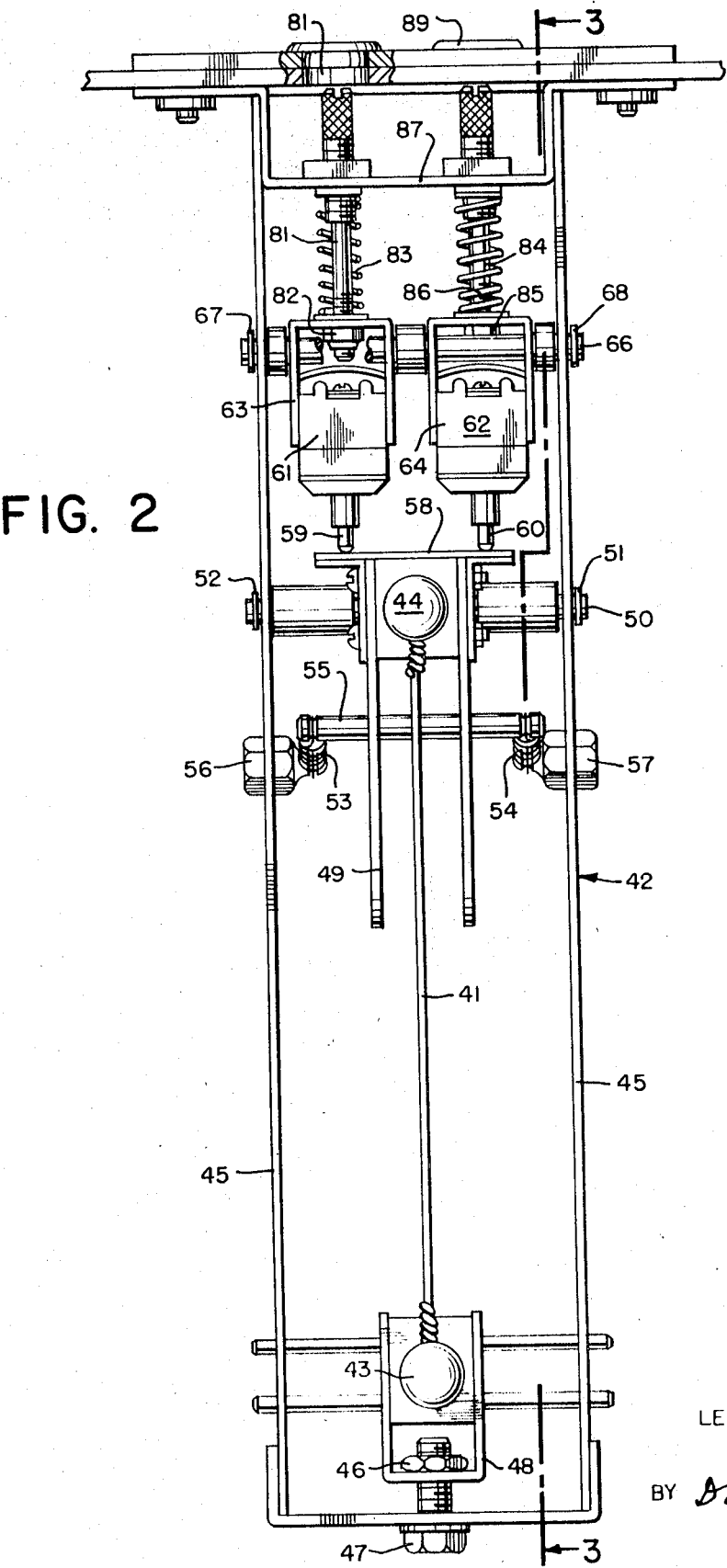
FIG. 2 is a plan view of a portion of the apparatus of the present invention including the monitor wire and two monitor switches.

Referring now to FIG. 2 of the drawings, there is shown a plan view of the control mechanism 42 which is enclosed in broken lines in the schematic of FIG. 1. The monitor wire 41 is stretched between two terminals 43 and 44. Terminal 43 is mounted in fixed relationship to the frame 45 of the control mechanism 42 by means of a nut 46, bolt 47 and bracket 48.

Terminal 44 is mounted on a pivotable bracket 49 which is spring-biased to place the monitor wire 41 under mild tension. As shown more clearly in FIG. 3, bracket 49 is pivotably mounted on frame 45 by means of a suitable rod 50 which extends through bracket 49 and is secured to the sides of frame 45 by C-rings 51 and 52. A pair of tension springs 53 and 54 are connected, at one end, to a rod 55 which is mounted on bracket 49, and, at the other end, to a pair of studs 56 and 57 which are mounted on the sides of frame 45. Hence, the action of springs 53 and 54 is to urge bracket 49 to pivot in a clockwise direction about rod 50 thus placing the monitor wire 41 under slight tension and urging the contact plate 58 of bracket 49 toward the actuators 59 and 60 of monitor switches 61 and 62.

The two monitor switches 61 and 62 are mounted on separate brackets 63 and 64 respectively. The brackets 63 and 64 are both pivotably mounted on frame 45 by means of a rod 66 which extends through both brackets 63 and 64 and is secured to the sides of frame 45 by C-rings 67 and 68.

Each of the two switches 61 and 62 is provided with a separate adjustment mechanism. For example, switch 61 provided with an adjustment screw 81 which is connected to bracket 63 by a nut 82 and spring 83. Adjustment screw 84 is connected to bracket 64 of switch 62 by a nut 85 and spring 86. Both adjustment screws 81 and 84 threadedly engage the fixed bracket 87. An opening 88 is provided so that adjustment screw 81 may be adjusted by a screwdriver or the like. A similar opening 89 is provided for adjustment screw 84.

Figure 3:
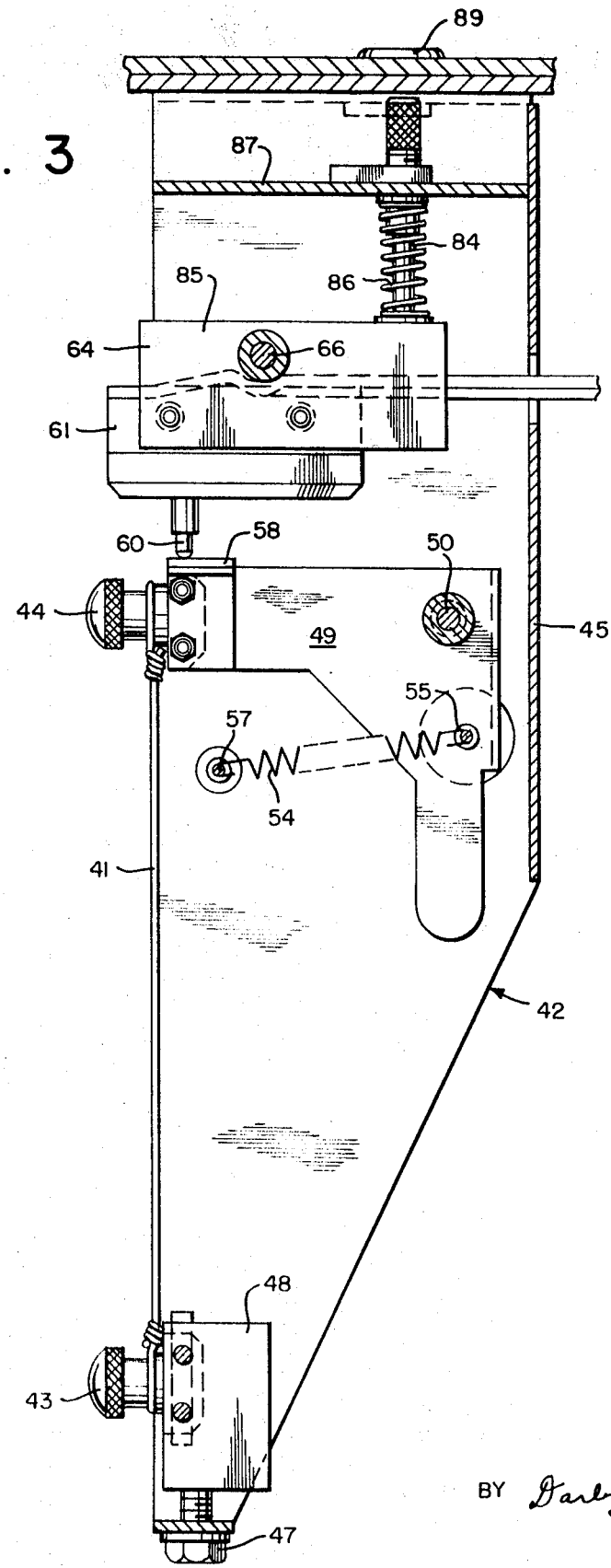
FIG. 3 is a cross-sectional view taken along the line 3—3 of the apparatus shown in FIG. 2.

It will be apparent from FIGS. 2 and 3 that the switches 61 and 62 are actuated by the thermal expansion of monitor wire 41. By appropriate setting of the adjustment screws 81 and 82, precise control of the actuation of the two switches 61 and 62 can be achieved. For example, if switch 61 is positioned somewhat lower than switch 62 by means of their respective adjustment screws 81 and 84, switch 61 will be actuated at a somewhat lower temperature of the monitor wire 41 than will switch 62. Accurate control of the actuation temperatures of the two switches can thus be obtained.

Referring again to FIG. 1 of the drawings, current passes through heating elements 21 and 22 and monitor wire 41 causing them to get hot. The heat from heating elements 21 and 22 is applied to the article to be heated such as, for example, the plastic film used in shrink film packaging. The heat melts, welds and seals the plastic film around the article to be packaged. At the same time, the heating of monitor wire 41 causes it to expand until the contact plate 58 presses against actuator 59 to close switch 61 as shown in FIGS. 2 and 3. This action occurs at a predetermined temperature controlled by the setting of adjustment screw 81.

The closing of switch 61 applied current through switch 23 and switch 61 to the coil 91 of relay 26. The energization of coil 91 operates to hold down the relay contacts 24 and 25 thus breaking the circuit to the primary winding 27 of transformer 28 and cutting off the application of current to heating elements 21 and 22 and monitor wire 41. The coil 91 remains energized by way of the circuit established through the lower contacts 25 of relay 26.

Energization of relay 26 also establishes a circuit through lower contact 25 to energize the coil 92 of relay 93, thus pulling down the contacts 94 and 95. Relay 93 is maintained in its energized state by way of the circuit established through normally closed switches 96 and 62, lower contact 95 and coil 92 of relay 93.

In addition, the energization of relay 26 establishes a circuit through contact 25, line 97 and switch contact 98 to energize coil 99 of time delay relay 100. The energization of coil 99 pulls down contact 101 which establishes a circuit to energize the solenoid 102. In the preferred form of apparatus according to the present invention, solenoid 102 actuates an air valve, which in turn, operates to retract the heating elements 21 and 22 from the article to be sealed.

As the heating elements 21 and 22 move away from the article, the contact switch 23 moves to its original position shown in FIG. 1, thus establishing a circuit through switch 23 and relay contact 94 to energize the primary winding 27 of transformer 28 and thereby cause further heating of heating elements 21 and 22 and monitor wire 41.

Movement of the contact switch 23 to the position shown in FIG. 1 also operates to deenergize the coil 91 of relay 26 thereby causing the relay contacts 24 and 25 to move to the position shown in FIG. 1. These actions also operate to deenergize coil 99 of time delay relay 100, thus deenergizing the solenoid 102.

The heating of heating elements 21 and 22 serves to burn off any residue of plasticizer or carbon which may have adhered to the heating elements during the preceding step of sealing a plastic film around an article for shrink film packaging. As the heating elements 21 and 22 and monitor wire 41 grow hotter, monitor wire 41 expands until contact plate 58 presses the actuator 60 of switch 62 as shown in FIGS. 2 and 3. It is noted that switch 62 will normally be set to be actuated at a somewhat higher temperature than switch 61 in order to insure that any residue of plasticizer or carbon will be completely burned off from the heating elements 21 and 22 before the next sealing step. Hence, it will be apparent that, during the cleaning cycle, switch 61 will be actuated prior to switch 62. However, the actuation of switch 61 will not operate to energize coil 91 of relay 26 because of the position of contact switch 23.

Actuation of the normally closed switch 62 breaks the circuit to coil 92 thus deenergizing the relay 93 and causing the relay contacts 94 and 95 to move to the position shown in FIG. 1. This cuts off the current to the primary winding 27 of transformer 28 thereby terminating the heat impulse which was applied to the heating elements 21 and 22 for the purpose of cleaning them prior to the next sealing operation.

The self-cleaning operation of the preferred form of apparatus according to the present invention is facilitated by the structure of the heating elements and their backup insulation. FIG. 4 is a side-elevational view of a portion of the heating element structure in the preferred form of apparatus according to the present invention. The heating element 21 is in the form of an electrical resistance wire 21 which is connected, at one end, to a suitable fixed terminal 111, and at the other end, to a movable element 112. The heating element 21 is maintained under tension by the action of a compression spring 113 which is supported by a portion 114 of the framework of the apparatus and acts against the movable element 112. The article to be heated is the double layer of plastic film 115 which rests on a heat-resistant supporting member 116. If desired, the heat-resistant supporting member 116 may be a conveyor belt in order to facilitate the introduction of articles to be sealed to the sealing station beneath the heating element 21, and to facilitate the removal of the articles after the sealing operation is complete. The heating element 21 is provided with backup insulation 117 so that when the entire heating element assembly 118 moves downward to bring the heating element 21 into contact with the plastic film 115, the backup insulation 117 will press against the upper surface of heating element 21 so as to help provide a firm uniform pressure of the heating element 21 against the film 115. When the heating element assembly 118 is raised, the heating element 21 is held free of the backup insulation 117 by the action of compression spring 113 in cooperation with the small block of insulating material 119. In this manner, the entire heating element 21 may be heated to a uniformly high temperature in order to burn off any residue of plasticizer or carbon which may have adhered to the heating element during the sealing step. No residues can become trapped between the heating element 21 and the backup insulation 117. Nonuniform heating which might result from contacts between the heating element 21 and backup insulation 117 is avoided.

Referring again to FIG. 1 of the drawings, the preferred form of heat-sealing apparatus according to the present invention includes a contact switch 131 which is actuated by the arm which carries heating elements 21 and 22. The switch 131 moves to the position shown in FIG. 1 when the arm reaches its fully raised position in response to the operation of the mechanism actuated by solenoid 102. Switch 131 establishes a circuit from the secondary winding 15 of transformer 12 through switch 131, wire 132, switch contact 133 and wire 134 to energize coil 135 of time delay relay 136. The energization of coil 135 pulls down relay contact 137, thus establishing a circuit through switch contact 138 to energize solenoid 139 which actuates a mechanism to operate the conveyor belt so as to remove the article previously sealed and introduce the next article to be sealed to the sealing station.

If automatic cycling of the apparatus is desired, switch 141 may be closed by the operator so as to establish a circuit from the primary winding 15 of transformer 12 through switches 131 and 141 to energize the coil 142 of time delay relay 143. The energization of coil 142 closes the relay contact 144 to establish a circuit through relay contact 145 to energize solenoid 20 which, as previously mentioned, actuates an air valve to operate a mechanism to bring the heating elements 21 and 22 into contact with the article to be heated.

The coil 146 of relay 147 will be energized by the operation of any one of the safety switches 16–19, one or more of which may be operated, for example, by contacting an article which is improperly located beneath one of the heating elements 21 or 22. Energization of the coil 146 pulls down the relay contacts 145, 148 and 149. A holding circuit is established through reset switch 151 and relay contact 149 to maintain the coil 146 in an energized condition until the reset switch 151 is opened. Relay contact 148 establishes a circuit to energize solenoid 102 which, as previously mentioned, actuates an air valve which, in turn, operates a mechanism to retract the heating elements 21 and 22 from the sealing station. The opening of relay contact 145 interrupts the automatic cycling feature.

While the preferred form of self-cleaning heating element according to the present invention has been described in conjunction with heat-sealing apparatus, it will be appreciated by those skilled in the art that the self-cleaning heating element of the present invention has potential utility in other applications such as, for example, soldering or other applications where impulse type heating is required and a self-cleaning heating element is desired. Appropriate modification of the subject self-cleaning heating element for use in such other applications is contemplated to be within the scope of the present invention.

I claim:

1. Self-cleaning apparatus for applying controlled heat to an article comprising:
    a heating element;
    means for bringing said heating element into contact with an article to be heated;
    means actuated by contact of said heating element with an article to be heated for applying electric power to said heating element;
    first means responsive to the temperature of said heating element for removing said heating element from said article when said heating element reaches a first predetermined temperature corresponding to the maximum temperature to be applied to an article to be heated;
    means for applying electric power to said heating element after said heating element is removed from an article to be heated for cleaning said heating element; and
    second means responsive to the temperature of said heating element for cutting off the electric power to said heating element when said heating element reaches a second predetermined temperature, said second predetermined temperature being higher than said first predetermined temperature.

2. The apparatus of claim 1, wherein said heating element comprises an operative portion for contacting the article to be heated, and a control portion for cooperation with said first and second temperature-responsive means.

3. The apparatus of claim 2 further comprising support means for supporting said control portion of said heating element under tension so as to resiliently urge said control portion of said heating element to expand lengthwise when heated.

4. The apparatus of claim 3 wherein said first means responsive to the temperature of said heating element comprises a first switch having an actuating member positioned to be actuated by said support means upon a predetermined degree of expansion of said control portion of said heating element.

5. The apparatus of claim 3 wherein said second means responsive to the temperature of said heating element comprises a second switch having an actuating member positioned to be actuated by said support means upon a predetermined degree of expansion of said control portion of said heating element.

6. The apparatus of claim 4 further comprising means for adjustably positioning the actuating member of said first switch so that said first switch will be actuated at a predetermined temperature of said control portion of said heating element.

7. The apparatus of claim 5 further comprising means for adjustably positioning the actuating member of said second switch so that said second switch will be actuated at a predetermined temperature of said control portion of said heating element.

8. The apparatus of claim 2 further comprising an insulative member for pressing said operative portion of said heating element into contact with said article to be heated, and means for supporting said operative portion of said heating element free of said insulative member when not in contact with said article to be heated in order to facilitate the cleaning thereof.

* * * * *